(12) United States Patent
Pruecklmayer

(10) Patent No.: US 11,088,758 B2
(45) Date of Patent: Aug. 10, 2021

(54) COMMUNICATION SYSTEM

(71) Applicant: MAXLINEAR, INC, Carlsbad, CA (US)

(72) Inventor: Stephan Pruecklmayer, Hoehenkirchen-Siegerstbrunn (DE)

(73) Assignee: MaxLinear, Inc., Carlsbad, CA (US)

( * ) Notice: Subject to any disclaimer, the term of this patent is extended or adjusted under 35 U.S.C. 154(b) by 292 days.

(21) Appl. No.: 15/628,944

(22) Filed: Jun. 21, 2017

(65) Prior Publication Data

US 2018/0026711 A1    Jan. 25, 2018

(30) Foreign Application Priority Data

Jul. 21, 2016 (DE) .......................... 102016008920.2
Jun. 8, 2017 (DE) .......................... 102017112598.1

(51) Int. Cl.
*H04B 7/24* (2006.01)
*H04K 1/00* (2006.01)
*H04L 29/06* (2006.01)

(52) U.S. Cl.
CPC .............. *H04B 7/24* (2013.01); *H04K 1/003* (2013.01); *H04L 29/06027* (2013.01)

(58) Field of Classification Search
CPC combination set(s) only.
See application file for complete search history.

(56) References Cited

U.S. PATENT DOCUMENTS

| 2002/0003873 A1* | 1/2002 | Rabenko ............... H04M 19/08 379/413 |
| 2002/0064183 A1* | 5/2002 | Larsen ................ H04L 12/6418 370/480 |
| 2006/0034481 A1* | 2/2006 | Barzegar ................ H04L 65/80 381/401 |
| 2010/0103943 A1* | 4/2010 | Walter .................... H04L 12/10 370/401 |
| 2013/0039017 A1* | 2/2013 | Lichoulas .............. H04Q 1/028 361/730 |
| 2014/0233951 A1* | 8/2014 | Cook ...................... H04L 63/02 398/67 |
| 2016/0020858 A1* | 1/2016 | Sipes, Jr. ............. H04B 10/808 398/45 |
| 2017/0054406 A1* | 2/2017 | Narla ...................... H02J 3/381 |

* cited by examiner

*Primary Examiner* — Xavier S Wong
(74) *Attorney, Agent, or Firm* — Maschoff Brennan

(57) ABSTRACT

A system is provided where one of a broadband termination unit or a gateway unit is supplied with power by the other one of the broadband termination unit or the gateway unit. Supplying may be done via a universal serial bus cable like a universal serial bus Type-C cable.

17 Claims, 6 Drawing Sheets

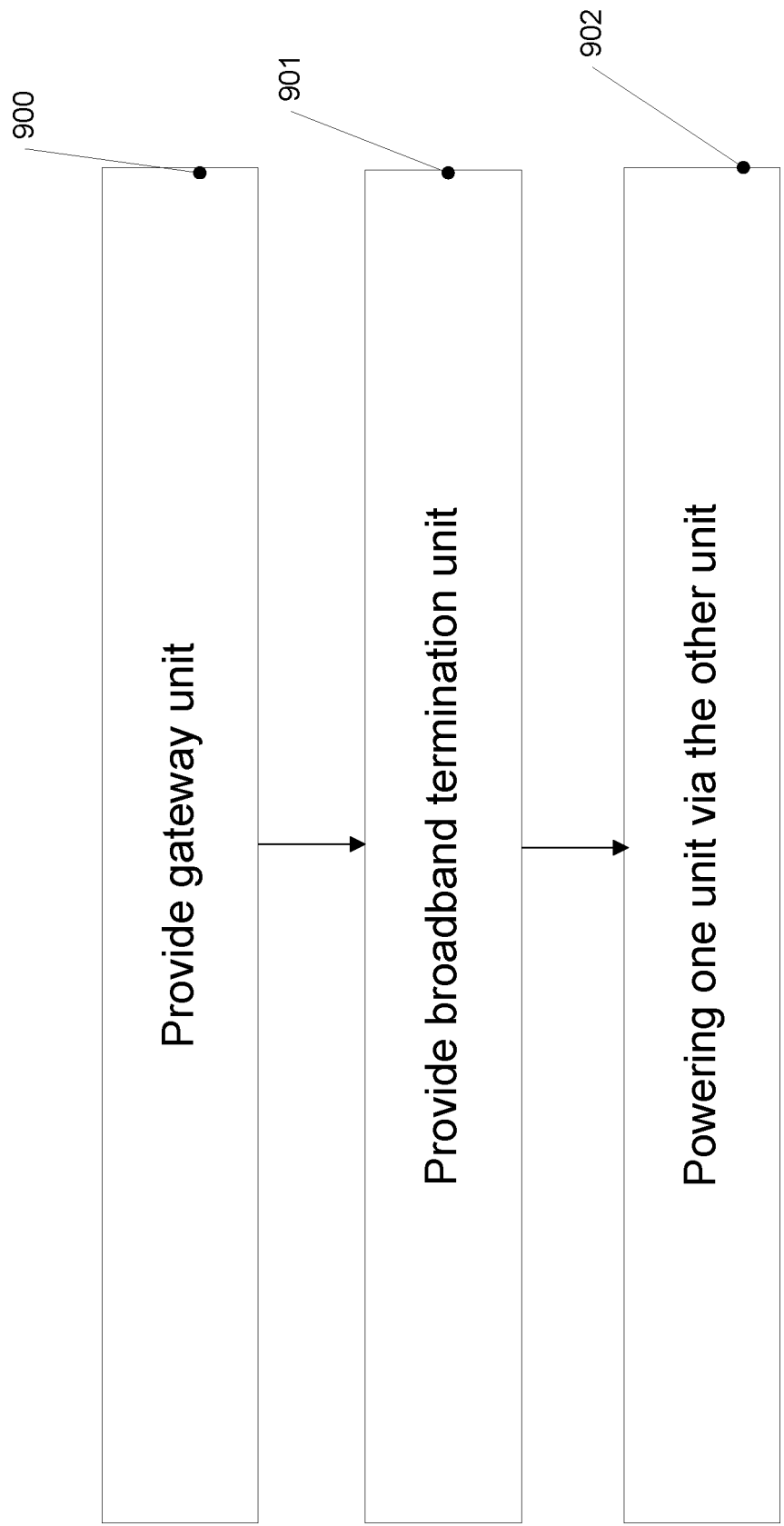

COMMUNICATION SYSTEM

REFERENCE TO RELATED APPLICATION

This application claims priority to German Patent Application No. 10 2017 112 598.1 filed on Jun. 8, 2017, and German Patent Application 10 2016 008 920.2 filed on Jul. 21, 2016, which are hereby incorporated herein by reference in its entirety.

FIELD

The present application relates to communication systems and devices usable for example in companies, residential homes and the like to connect to a broadband network.

BACKGROUND

In communication networks, particularly telecommunication of broadband traffic, it is often the case that multiple gateways are needed to provide communication of the broadband traffic. In optical systems, for example, it is common to provide a box at an entry point of a residence or building as a first unit and connect this gateway that sits at the entry to a second box or gateway inside the residence or building as a second unit.

One reason for this is because of country laws or restrictions on telecommunication that separate the network business (i.e. providing a broadband network) from the residential gateway (RG) business, owing to antitrust laws, which require that the entry box or gateway, otherwise known as an SFU (single family unit), be separate physically from the box or gateway inside, also known as the residential gateway. Another related reason to arrange such a two-box system, as it is known in the optics industry, is because the network carrier responsible for the SFU needs to update their gateway frequently, for example regarding parameters, protocol and the like, whereas the residential gateway, which is typically provided by a CPE (Customer Premises Equipment) manufacturer, is updated using a different protocol, etc. For these reasons, such a two-box system is common throughout the industry.

Problematically, the residential gateway needs to be powered separately from the SFU, since the two units are in separate physical locations. In addition, not only the network processor that processes the broadband communication needs to be powered, but also the system board on which it sits, and possibly the gateway itself, i.e., the LEDs on the residential gateway etc. This results in a need to power the residential gateway with a significant amount of power.

Another restriction is that the present day system boards available are not capable to redistribute power. For this reason, as separate power supply is required to drive the system board for both the RG and the separate SFU.

In other words, separate power supplies are conventionally provided to the residential gateway and the broadband network termination (e.g. SFU) inside the home. As the SFU commonly is arranged at a location in a house near a wall where a broadband connection is offered from the outside, this means that a corresponding power socket has to be provided in this location.

SUMMARY

According to an embodiment, a system is provided that comprises a gateway unit comprising a gateway circuit to provide communication gateway functions and a first connector, and a broadband termination unit physically separate from the gateway unit and comprising a broadband termination circuit to terminate a broadband connection and a second connector. The system further comprises a cable coupled to the first connector and the second connector, wherein the gateway unit and the broadband termination unit are configured to communicate data via the cable, and wherein one of the gateway unit or the broadband termination unit is configured to supply the other one of the gateway unit and the broadband termination unit with electrical power via the cable.

According to another embodiment, a broadband termination unit is provided and comprises a broadband termination circuit configured to communicate data to and from a broadband network connection, a connector, and a data communication circuit configured to communicate data via the connector. The termination unit further comprises a voltage converter coupled to the connector and configured to generate an internal supply voltage supplying the broadband termination unit based on a voltage at the connector.

According to yet another embodiment, a residential gateway device is provided and comprises a connector, a gateway circuit coupled to the connector, and a voltage converter coupled to the connector to generate a voltage at the connector such that the residential gateway device is capable of communicating via the connector with a broadband termination unit and to supply the broadband termination unit with power via the connector.

According to yet another embodiment, a method is provided and comprises providing a gateway unit, and providing a broadband termination unit separate from the gateway unit. The method further comprises communicating between the gateway unit and the broadband termination unit via a cable, and supplying one of the broadband communication unit or the gateway unit with power via the cable by the other one of the broad gateway unit or the broadband termination unit.

The above summary is merely intended to provide a brief overview over some embodiments and is not to be construed as limiting.

BRIEF DESCRIPTION OF THE DRAWINGS

FIG. 6 is a flowchart of a method according to an embodiment.

DETAILED DESCRIPTION

Figure 1:
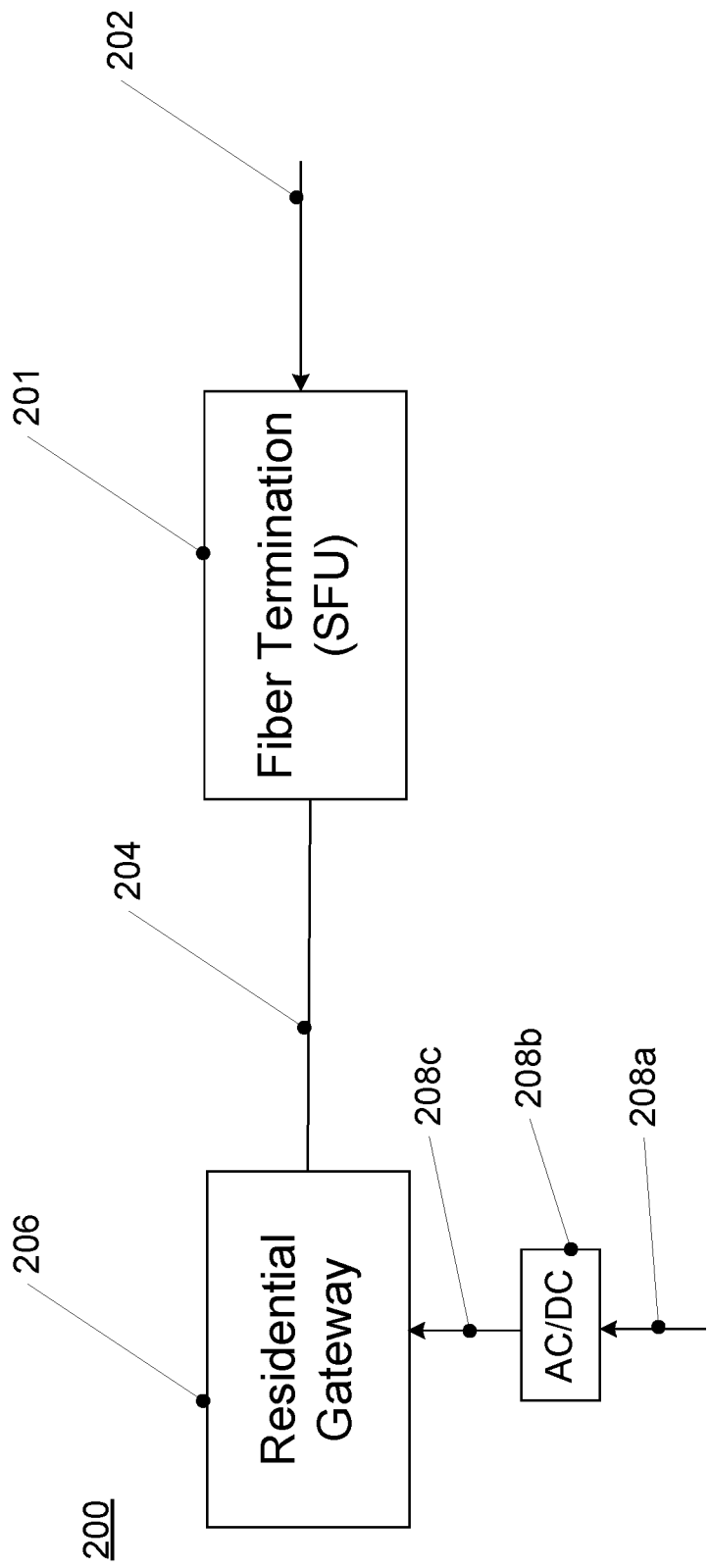
FIG. 1 is a schematic of an embodiment implementing the invention.

In the following, various embodiments will be described in detail with reference to the attached drawings. It has to be noted that these embodiments serve as illustrative examples only and are not to be construed as limiting the scope of the present application. For example, while an embodiment may be described as comprising a plurality of features or elements, this serves illustration purposes only, and in other embodiments some of these features or elements may be omitted and/or be replaced by alternative features or elements. Furthermore, in some embodiments additional features or elements in addition to those described herein or shown in the drawings may be provided, for example features or elements conventionally used in communication systems, without departing from the scope of the present application. Features or elements from different embodiments may be combined with each other to form further embodiments. Variations are modifications described with respect to one of the embodiments may also be applied to other embodiments.

Any direct electrical connections or couplings shown in the drawings or described herein, i.e. connections or couplings without intervening elements, may also be implemented as indirect connections or couplings, i.e. connections or couplings with one or more additional intervening elements, and vice versa, as long as the general function of the connection or coupling, for example to transmit a certain kind of information or signal or to provide a certain kind of control, is essentially maintained. Connections or couplings may be implemented as wire-based connections or couplings or as wireless connections or couplings, or mixtures thereof, unless noted otherwise.

FIG. 1 is a block diagram of a system according to an embodiment. In this embodiment, the system comprises a broadband termination like a fiber termination 201, also referred to a single family unit (SFU), at which a broadband network connection like a fiber 202 terminates. Furthermore, the system comprises a gateway device 206, for example a residential gateway device, but not limited thereto, which provides gateway function for a home, i.e. serves as an interface for various customer premises equipment devices like laptops, tablets, smartphones, routers, switches etc. on the one hand and fiber termination 210 on the other hand. Gateway device 206 in system 200 is powered by a power supply 208b, which for example converts AC (alternating current) power 208a to DC (direct current) power 208c with a voltage level suitable for powering gateway device 206. Gateway device 206 and fiber termination unit 201 may be provided in separate housings and may be arranged spaced apart from each other, for example in different rooms of a house.

Gateway device 206 and fiber termination unit 201 are coupled by a wire connection 204. Wire connection 204 on the one hand serves to exchange data between gateway device 206 and fiber termination 201, for example according to an Ethernet-based protocol. On the other hand, via wire connection 204 fiber termination unit 201 is supplied with electrical energy from gateway device 206. In this way, fiber termination unit 201 unlike some conventional solutions does not require its own power supply connected for example to a mains power socket. Nevertheless, fiber termination unit 201 as will be explained later may for example comprise a DC/DC converter to convert a voltage received via wire connection 204 from gateway device 206 to a voltage level needed in fiber termination unit 201.

In some implementations, sufficient electrical power is provided via connection 204 to drive at least a network processor of fiber termination unit 201, or to provide the entire system of fiber termination unit 201. In contrast, in present solutions only data is transmitted on a connection between a residential gateway and a corresponding broadband termination.

It should be noted that in other embodiments, the situation may be reversed, such that fiber termination 201 has a power supply like power supply 208b and powers gateway device 206 via connection 204, such that gateway device 206 does not require its own power supply.

In some embodiments, data transmission via connection 204 is performed via an Ethernet-based protocol. In other embodiments, other communication protocols may be used. In some embodiments, connection 204 is high speed serial connection like a universal serial bus (USB) connection, but not limited thereto, and a communication protocol may be an Ethernet type networking over USB protocol like Ethernet control mode (ECM), Ethernet emulation model (EM), network control model (NCM) or other communication device class (CDC) protocols.

In some embodiments, connection 204 is a USB Type-C connection, with corresponding USB Type-C connectors at gateway device 206 and fiber termination unit 202. Generally, USB cables provide the possibility to transmit both data and power. Therefore, in embodiments using USB connections, no modifications to existing cables are needed, but conventional USB cables may be used in some embodiments, although the present application is not limited thereto.

Figure 2:
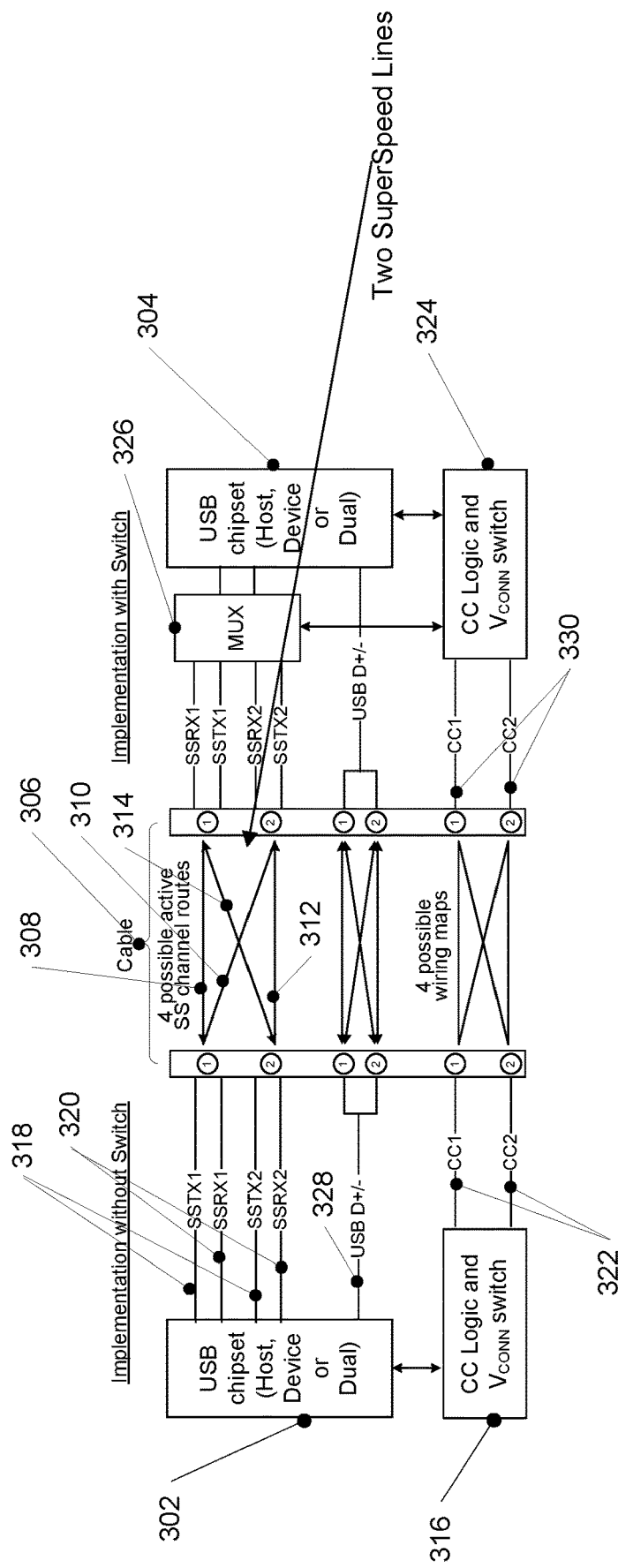
FIG. 2 illustrates a logical model for data bus routing across USB Type-C based ports.

FIG. 2 illustrates an example USB connector arrangement usable as connection 204 in the embodiment of FIG. 1. While a USB connector arrangement is shown and described herein in detail, other connectors and connection types, for example other high speed serial connections, may also be used. Therefore, USB serves merely as an illustrative example here.

FIG. 2 illustrates one possible connector type employable in embodiments. FIG. 2 illustrates a logical data bus model for a USB Type-C-based downstream facing port, which may include, for example control logic 316 connected to a USB Type-C-based upstream facing port UFP generally indicated by 304, which may include, for example control logic 324. Abbreviations and implementation details as used herein when referring to USB-C may be as explained in Universal Serial Bus Type-C Cable and Connector Specification Rev. 1.1 of Apr. 3, 2015 unless noted otherwise herein. In this embodiment a USB chipset DFP (Downstream Facing Part) 302, is connected to a CC logic and VCONN switch or control logic (316) which is then coupled/connected through the cable (when connected) to the USB chip set UFP (Upstream Facing Part) 304. UFP 304 is either connected or has included CC logic and VCONN switch or control logic (324). The details of the pins and control logic will be further described. In other cables, a different structure is possible.

The present embodiment makes it possible to power the network processor or the system board. In the instant embodiment, a Multiplexer 326 is arranged on the side of the power receiving unit, which is SFU 201 in FIG. 1. Multiplexer 326 is controlled by sending it a select signal according to the solution to multiplex to select the correct data channels. In addition a power retrieving circuit allows the solution to select the power needed for powering the network processor or the system board.

In some embodiments VBUS (FIG. 2, for example) and GND pins (not shown) of the USB Type-C cable are used to power the SFU (or alternatively the residential gateway). It shall be appreciated that the USB cables provide a special power channel that is capable to carry more power, i.e., for charging etc. However, in some embodiments the Ethernet interface may be modified in order to accept sufficient power to drive the on board devices, i.e., the network processor or the system board. In accordance with the USB specification the USB Type-C cable is a cable that connects USB chip sets on both sides.

Now the details of a USB Type-C as usable in some embodiments shown in FIG. 2 shall be described. The USB cable 306 is located between DFP (Downstream Facing Part) 302 and UFP (Upstream Facing Part) 304 can be in one of four possible connected states when viewed by the DFP 302:
1. Un-flipped straight through—Position #1⇆Position #1 (308)
2. Un-flipped twisted through—Position #1⇆Position #2 (310)
3. Flipped straight through—Position #2⇆Position #2 (312)
4. Flipped twisted through—Position #2⇆Position #1 (314)

This is shown by arrows in FIG. 2 which show the un-flipped straight connection from #1 to #1 308 and the un-flipped twisted connection from #1 to #2 (310). The arrows show the flipped straight connection from #2 to #2 (312) and the flipped twisted connection from #2 to #1 (314).

To establish the proper routing of the active USB data bus from DFP 302 to UFP 304, a standard USB Type-C cable 306 is wired such that a single configuration channel (CC) wire 322 is position oriented with a first USB SuperSpeed signal pairs (SSTX1/SSTX2 318 and SSRX1/SSRX2 320)—in this way, a CC wire 322 and USB SuperSpeed data bus wires 320 that are used for signaling can be identified within the cable track by way of the orientation and twist of the cable. By being able to detect which of the CC configuration pins 322 (CC1 or CC2) at the receptacle is terminated by UFP 304, DFP 302 is able to determine which SuperSpeed USB signals are to be used for the connection and the DFP 302 can use this to control the functional switch Multiplexer 326 on a remote side for routing the SuperSpeed USB signal pairs. Similarly in the UFP 304, detecting which of the CC pins 330 at the receptacle is terminated by the DFP 302 allows the UFP 304 to control the functional switch Multiplexer 326 that routes its SuperSpeed USB signal pairs. As already mentioned, USB and the way power may be transmitted via USB cables illustrated serves only as an example, and in other embodiments e.g. ethernet cables may be used.

It shall be appreciated that there may be different arrangements of the DFP and UFP other than that are shown in FIG. 2. For example, USB hubs may be arranged with a single UFP connected up to a host or USB hub and one or more DFPs for connecting other devices. In any case, the power is transferred from the host or USB hub according to the solution described.

To continue, the configuration channels CC1, CC2 usable in some embodiments shall now be described. For the USB Type-C solution shown in this particular embodiment, two pins on the connector 322, CC1 and CC2, are used to establish and manage the DFP-to-UFP connection. Functionally, the configuration channel(s) may be used to serve one or more of the following purposes in some embodiments.

Detect attachment of USB ports, e.g. a DFP to a UFP
Resolve cable orientation and twist connections to establish USB data bus routing as described
Establish DFP and UFP roles between two attached ports
Discover and configure VBUS (discussed later): USB Type-C Current modes or USB Power Delivery
Configure VCONN (discussed later)
Discover and configure optional Alternate and Accessory modes The selection and manner of selection of the various functions through setup of the configuration channels 322 according to some embodiments will not be discussed here in detail as the skilled person will readily know how to configure these functions as explained in the publicly available USB specifications. What is relevant to the instant embodiment is that the configuration channels 322 may control or be used to control the Multiplexer 326 for selecting the power signals. As indicated, the power signals may be sent over the SuperSpeed USB Pins/channels and the configuration channels 322 are selected to inform the UFP which channel and/or timing is used for the power signals.

Now the SuperSpeed USB Pins used in some embodiments shall be described in more detail. The SSTXp1, SSTXn1 (SSTXp2, SSTXn2) 318 (where p and n are integers indicating the port) pins are used to implement the transmit path of a USB SuperSpeed interface. The transmitter differential pair in a port (p) are routed to the receiver differential pair in the port (n) at the opposite end of the path. The skilled person will readily understand how to physically implement the pins from definitions of the electrical characteristics, enumeration, protocol, and management features for the interfaces as defined in the USB specifications publicly available in case a USB cable is used.

Connections to pins D+/D− 328 are provided to serve as both legacy data pins and for indicating an orientation of the USB Type-C cable (so called flipping pins). In USB 2.0, the D+/D− pins are used for data and are again provided her as legacy pins in case the cable is plugged into a USB 2.0 port. The two pairs of pins (on both port sides) are defined to enable the so called plug flipping feature, which are always correctly connected by cable design. These pins may be provided for backward compatibility in some embodiments. It shall be appreciated that such an embodiment therefore is applicable to USB 2.0 port as well since the power is provided over VBUS or SuperSpeed channels.

Similarly, connections 320 to the SSRXp1, SSRXn1 (SSRXp2, SSRXn2) pins (where p and n are integers indicating the port) are provided: These pins are used to implement a receive path of a USB SuperSpeed interface usable in some embodiments. The receiver differential pair (p) in a port are routed to the transmitter differential pair (n) in the port at the opposite end of the path. The pins and connections may be implemented from definitions of the electrical characteristics, enumeration, protocol, and management features for the interfaces as defined in the USB specifications publicly available, e.g. according to the Universal Serial Bus Cable and Connector Specification Revision 1.1 of Apr. 3, 2015. Terminology used describing USB-Type-C connectors herein, in particular pin names and abbreviations, may correspond to terminology used in this specification.

The Power and Ground Pins used in some embodiments shall now be described. These are also referred to as VBUS pin(s) (not shown in FIG. 2) provide power (and ground pin GND) to provide the USB cable bus power e.g. as defined by the USB specifications. A cable has to be connected so that a power is present when a DFP-to-UFP (Downstream Facing Part to Upstream Facing Part) connection across the CC channel is provided. VCONN pin(s) may be used to power active cables. In embodiments, VBUS is used to power the SFU in some embodiments.

It shall be appreciated that the power to the receiving power side (e.g. fiber termination unit 201) may be implemented not only over VBUS, but may be provided via other types of pins depending on the type of cable used in some embodiments. In this manner, embodiments provide the ability to send more power to the receiving side by sending the power over multiple channels. The power is then added or sent to various devices or components on the receiving side. Therefore, a multiple power source is provided in some embodiments.

Now the Configuration Pins (CC1, CC2, CC) 322, 330 as used in some embodiments shall be described. These pins in conventional USB devices are used to detect connections and configure and manage the interface across the USB Type-C cables and connectors according to the available USB specifications. However, in some embodiments these channels are also used to provide power to the receiving side (e.g. fiber termination unit 201) as explained above. Once a connection is established, CC1 or CC2 will be reassigned for providing power over the VCONN pin of a USB plug in some embodiments. Notably, CC is an additional control pin that, as noted, may be used to supply the VCONN power. The control channels may be configured accordingly according to USB specifications publicly available.

Figure 3:
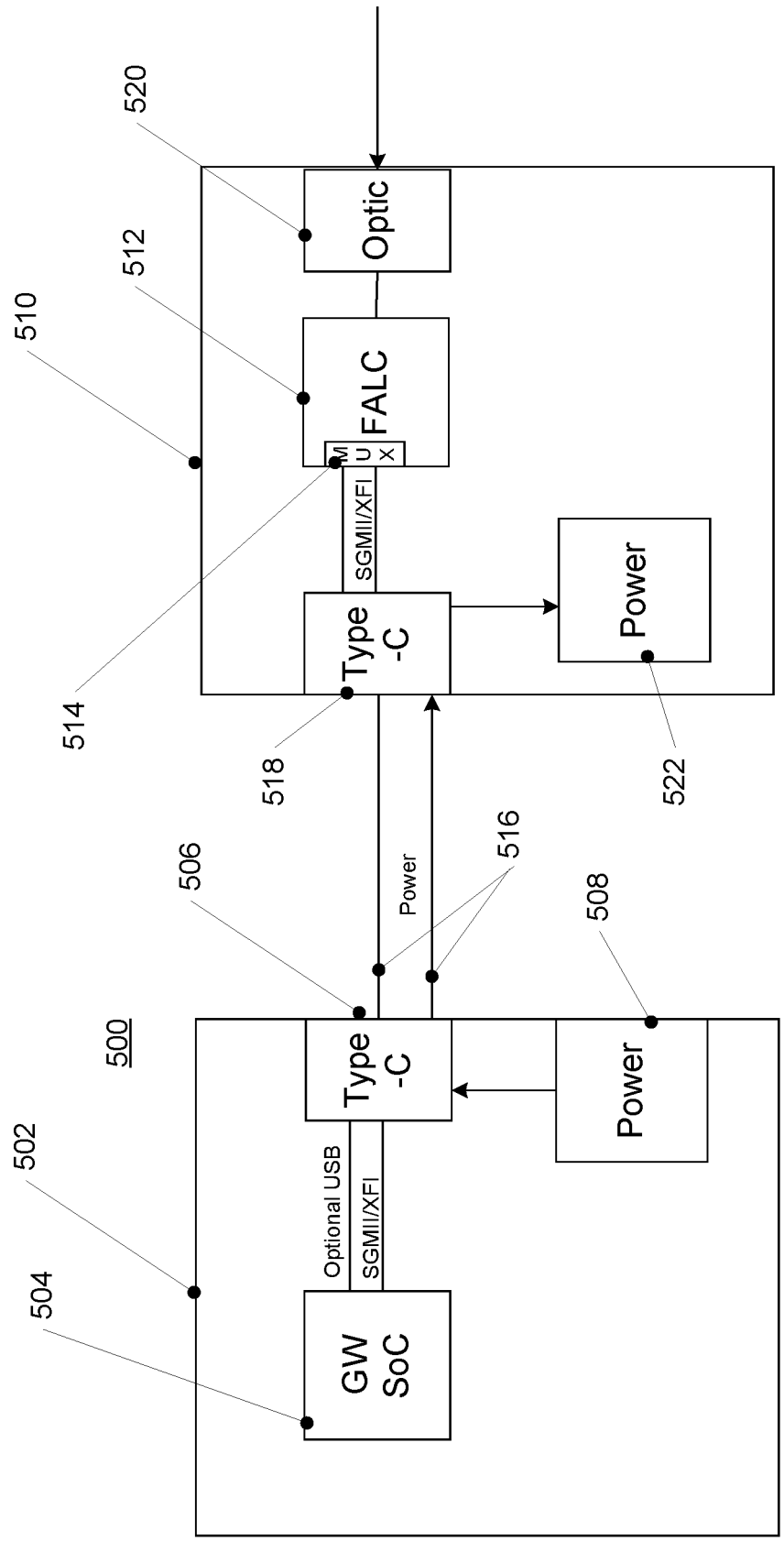
FIG. 3 shows an alternative implementation of a USB Type-C cable.
Figure 4:
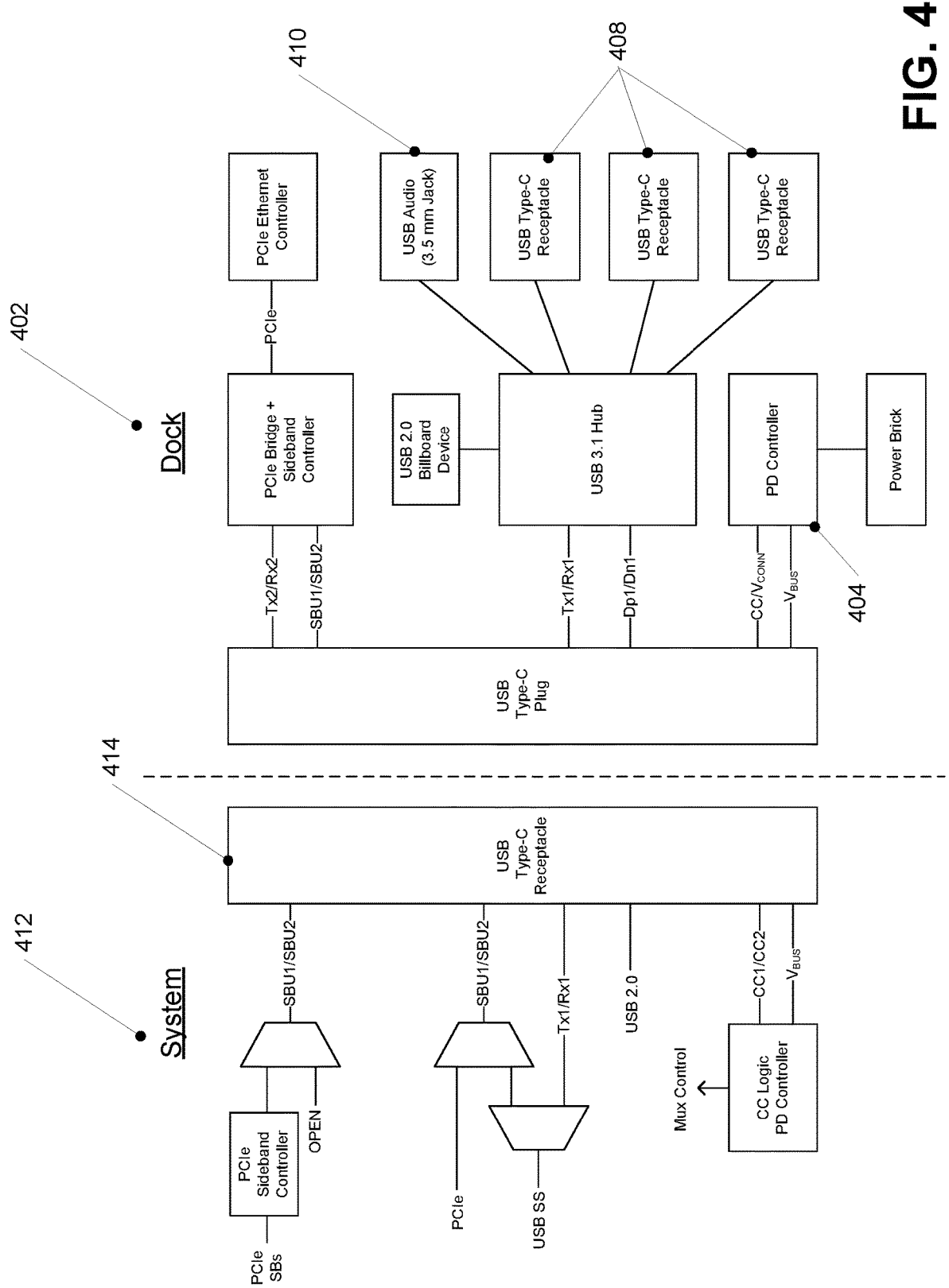
FIG. 4 is a schematic of an example implementation of the USB Type-C cable.

FIG. 4 illustrates a USB/PCIe dock example in a block diagram form. This embodiment illustrates the use of structured vendor defined messages (VDM) to expose and access functionality beyond a basic functionality defined by the USB Type-C Connector 414. The device of FIG. 3 uses its USB Type-C connector 414 to make connection when placed in a cradle dock 402. This example only illustrates the functional connections. The cradle dock 402 provides mechanical alignment and attachment in addition to those provided by the USB Type-C connector and allows for only one orientation. The dock 402 uses USB power delivery (PD) 404 to manage charge/power to the Device. The dock uses PCIe to connect additional dock functions, e.g. a network controller. The dock 402 has a USB hub 406 that exposes three external USB ports 408 and attached internal USB Devices 410, e.g. a USB audio Device a 3.5 mm audio jack. Similar connections may be used in the embodiments described herein, e.g. the embodiment of FIG. 1 above or the embodiment of FIG. 4 below. In some embodiments, such standard connectors and cables are adapted to the transfer of Ethernet type transmission over the same physical channel as provided for vendor defined messages (VDM) in USB.

Figure 5:
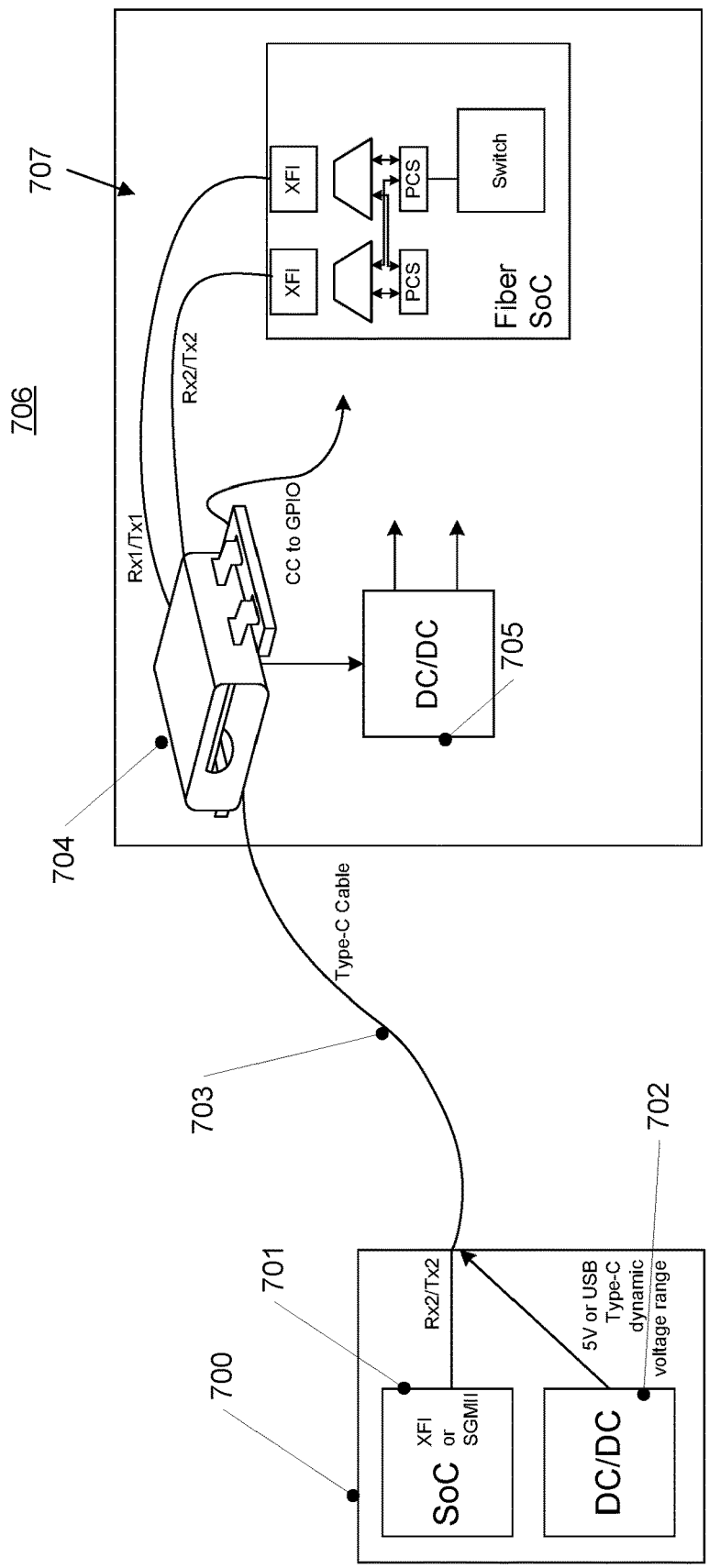
FIG. 5 shows one implementation how a USB Type-C cable connects to and powers a chip/board according to an embodiment.

FIG. 5 is a schematic of an implementation according to an embodiment and auto detection of a USB Type-C cable. In this embodiment, a physically separated Residential Gateway 502, equipped with a System on Chip SoC device 504 that implements at least some of the functions of the residential gateway is designed to broadcast data through a high speed serial interface 506 like a Serial Gigabit Media Independent Interface (SGMII) or a SerDes Framer Interface/10G Framer Interface (SFI/XFI), to give a few examples, is powered directly or indirectly by a power supply 508 based on an externally received power, e.g. from a power socket. A physically separated broadband termination unit 510, e.g. SFU, may be, in one alternative, equipped with an Ethernet port 512 with an integrated multiplexer 514. The Ethernet port may be selected to receive data via a USB-Type-C cable 516 according to any Ethernet over USB protocol. As show, the power may be transmitted from the physically separated Residential Gateway 502 through a USB Type-C cable 516 over a USB type socket, 518. In other embodiments, an SGMII interface may be used. Ethernet port 512, for that matter, may be selected from conventional Ethernet port designs. Furthermore, broadband termination unit 510 comprises an internal power supply 522 that receives power via USB Type-C cable 516 and converts it to power usable in unit 510, if necessary, e.g. by using a DC/DC-converter.

Furthermore, this embodiment as mentioned shows that the broadband termination unit 510 equipped with the Ethernet port 512 with the integrated multiplexer (514) is also capable of auto detection of the USB Type-C cable 516. Auto detection is an automatic detection of the USB Type-C cable by the integrated multiplexer 514 which is configured to automatically detect USB Type-C cable 516, distinguish between power and data from control signals sent over a control line of USB Type-C cable 516 and accept and further independently without using any additional powering cable transmit enough power from the USB Type cable to the broadband termination unit 510. As will be appreciated, not only digital data but sufficient power is transmitted through the USB Type-C cable 506 between physically separated Residential Gateway 502 and broadband termination unit 510 to power the broadband termination unit 510.

Integrated multiplexer means that the multiplexer is designed into the Ethernet port and may be purchased as complete unit off-the-shelf. In such embodiments, a special multiplexer need not be added to the existing design which would require normally a complete rearrangement of the network processor or system board. The multiplexer switches between power and data, that is, distinguishes between the power and the data, by for example control of the network processor, which may be able to distinguish power from data from control signals sent over the control line of the USB type cable for example. The data and power are shown as separate in the embodiment, but may be within the same cable shielding in this and other embodiments.

FIG. 5 illustrates a situation where a device 706, for example a broadband termination device, is powered via a USB Type-C cable 703 by a further device 700, for example a residential gateway. Device 700 comprises a system on chip (SOC) 701 for performing gateway functions and a DC/DC converter 702 which converts an internal voltage used in device 700 to a voltage suitable for transmission over USB cable 703, for example a voltage of 5 Volts as usually used in USB power supplies. Device 700 in embodiments may be powered using an external power supply like a mains cable.

In device 706, USB cable 703 terminates at a USB Type-C connector 704. The voltage delivered is converted by DC converter 705 to an internal voltage for device 706. Moreover, data is received by or transmitted by a device part 707, for example a communication chip used for the broadband network termination.

FIG. 6 illustrates a method according to an embodiment. While the method of FIG. 6 is illustrated as a series of acts or events, the order in which these acts or events are described is not to be construed as limiting. The method of FIG. 6 will be described referring to FIGS. 1-5 for ease of illustration, but may also be implemented independently therefrom. At 900, the method comprises providing a gateway unit, for example a residential gateway. At 901, the method comprises providing a broadband termination unit, for example a fiber termination unit like a SFU, as described. At 902, the method comprising powering one of the gateway unit or the broadband termination unit via the other one of the gateway unit or the broadband termination unit via a corresponding cable, for example a USB cable. The cable may also be used for data transmission. Other methods may also be provided.

According to some embodiments, examples as listed below are provided.

Example 1

A system, comprising:
a gateway unit comprising a gateway circuit to provide communication gateway functions and a first connector,
a broadband termination unit physically separate from the gateway unit and comprising a broadband termination circuit to terminate a broadband connection and a second connector,
a cable coupled to the first connector and the second connector,
wherein the gateway unit and the broadband termination unit are configured to communicate data via the cable, and
wherein one of the gateway unit or the broadband termination unit is configured to supply the other one of the gateway unit and the broadband termination unit with electrical power via the cable.

Example 2

The system of example 1, wherein the first and second connectors are universal serial bus connectors, and the cable is a universal serial bus cable.

Example 3

The system of example 2, wherein the universal serial bus connectors are Type-C universal serial bus connectors, and the cable is a Type-C universal serial bus cable.

Example 4

The system of example 1, wherein the gateway unit and the broadband termination unit are configured for the communicating of data using an Ethernet type protocol.

Example 5

The system of example 1, wherein the other one of the gateway unit and the broadband termination unit comprises a direct current/direct current converter coupled to the first or second connector, respectively, to convert a voltage on the cable to an internal supply voltage level of the other one of the gateway unit and the broadband termination unit.

Example 6

The system of example 1, wherein the one of the gateway unit and the broadband termination unit comprises a direct current/direct current converter configured to convert an internal supply voltage of the one of the gateway unit or the broadband unit to a voltage to be provided via the cable.

Example 7

The system of example 1, wherein the one of the gateway unit or the broadband unit comprises a power supply to be connected to a mains power.

Example 8

The system of example 1, wherein the broadband termination unit is a fiber termination unit.

Example 9

The system of example 1, wherein the gateway unit is a gateway, for example residential gateway.

Example 10

A broadband termination unit, comprising:
a broadband termination circuit configured to communicate data to and from a broadband network connection,
a connector,
a data communication circuit configured to communicate data via the connector, and
a voltage converter coupled to the connector and configured to generate an internal supply voltage supplying the broadband termination unit based on a voltage at the connector.

Example 11

The broadband termination unit of example 10, further comprising a multiplexer separating data communication through the connector from the voltage supplied at the connector.

Example 12

The broadband termination unit of example 10, wherein the connector is a universal serial bus connector.

Example 13

The broadband termination unit of example 10, wherein the broadband termination unit is a fiber termination unit.

Example 14

A residential gateway device, comprising:
a connector,
a gateway circuit coupled to the connector, and
a voltage converter coupled to the connector to generate a voltage at the connector such that the residential gateway device is capable of communicating via the connector with a broadband termination unit and to supply the broadband termination unit with power via the connector.

Example 15

The residential gateway device of example 14, wherein the connector is a universal serial bus connector.

Example 16

A method, comprising:
providing a gateway unit,
providing a broadband termination unit separate from the gateway unit,
communicating between the gateway unit and the broadband termination unit via a cable, and
supplying one of the broadband communication unit or the gateway unit with power via the cable by the other one of the broad gateway unit or the broadband termination unit.

Example 17

The method of example 16, wherein communicating comprises communicating via an Ethernet type protocol.

Example 18

The method of example 16, further comprising, at the one of the gateway unit or broadband termination unit, converting a voltage supplied on the cable to an internal supply voltage.

Example 19

The method of example 16, further comprising, at the other one of the gateway unit or the broadband termination unit, converting an internal supply voltage to a voltage supplied on the cable.

Example 20

The method of example 16, wherein the cable is a universal serial bus Type-C cable.

The above examples serve only for illustration purposes and are not to be construed as limiting.

The invention claimed is:

1. A system, comprising:
a residential gateway comprising a gateway circuit to provide communication gateway functions and a first connector, wherein the first connector includes a universal serial bus Type-C connector,
a broadband termination unit physically separate from the residential gateway and comprising a broadband termination circuit to terminate a broadband connection from a broadband network and a second connector, wherein the residential gateway serves as an interface between customer premises equipment devices and the broadband termination unit,
a cable coupled directly to the first connector and directly to the second connector,
wherein the residential gateway and the broadband termination unit are configured to communicate data via the cable, and wherein electrical power is supplied, via the cable, by either the broadband termination unit or the residential gateway.

2. The system of claim 1, wherein the first and second connectors are universal serial bus connectors, and the cable is a universal serial bus cable.

3. The system of claim 2, wherein the universal serial bus connectors are Type-C universal serial bus connectors, and the cable is a Type-C universal serial bus cable.

4. The system of claim 1, wherein the residential gateway and the broadband termination unit are configured for the communicating of data using an Ethernet type protocol.

5. The system of claim 1, wherein the residential gateway comprises a direct current/direct current converter coupled to the first connector to convert a voltage on the cable to an internal supply voltage level of the residential gateway.

6. The system of claim 1, wherein the broadband termination unit comprises a direct current/direct current converter configured to convert an internal supply voltage of the broadband termination unit to a voltage to be provided via the cable.

7. The system of claim 1, wherein the broadband termination unit comprises a power supply to be connected to a mains power.

8. The system of claim 1, wherein the broadband termination unit is a fiber termination unit.

9. A broadband termination unit terminating a broadband connection from a broadband network, comprising:
a broadband termination circuit configured to communicate data to and from a broadband network connection,
a universal serial bus Type-C connector,
a data communication circuit configured to communicate data via the connector, and
a voltage converter coupled to the connector and configured to generate a voltage at the connector that facilitates both communication with a residential gateway via the connector and supply of power via the connector to the residential gateway, wherein the residential gateway serves as an interface for customer premises equipment devices and the broadband termination unit.

10. The broadband termination unit of claim 9, further comprising a multiplexer separating data communication through the connector.

11. The broadband termination unit of claim 9, wherein the broadband termination unit is a fiber termination unit.

12. A residential gateway device, comprising:
a connector,
a gateway circuit coupled to the connector, and
a voltage converter coupled to the connector and configured to generate an internal supply voltage supplying the residential gateway device based on a voltage at the connector, wherein the voltage is supplied, via a universal serial bus Type-C cable, to a broadband termination unit that is physically separate from the residential gateway device,
wherein the broadband termination unit terminates a broadband connection from a broadband network and the residential gateway device serves as an interface for customer premises equipment devices and the broadband termination unit.

13. The residential gateway device of claim 12, wherein the connector is a universal serial bus connector.

14. A method, comprising:
providing a residential gateway,
providing a broadband termination unit separate from the residential gateway,
communicating between the residential gateway and the broadband termination unit via a cable having at least one universal serial bus Type-C connector, and
supplying the residential gateway with power via the cable by the broadband termination unit,
wherein the broadband termination unit terminates a broadband connection from a broadband network and the residential gateway serves as an interface for customer premises equipment devices and the broadband termination unit.

15. The method of claim 14, wherein communicating comprises communicating via an Ethernet type protocol.

16. The method of claim 14, further comprising, at the residential gateway, converting a voltage supplied on the cable to an internal supply voltage.

17. The method of claim 14, further comprising, at the broadband termination unit, converting an internal supply voltage to a voltage supplied on the cable.

\* \* \* \* \*